J. B. MARTIN.
COASTER.
APPLICATION FILED MAY 16, 1914.
1,128,810.
Patented Feb. 16, 1915.
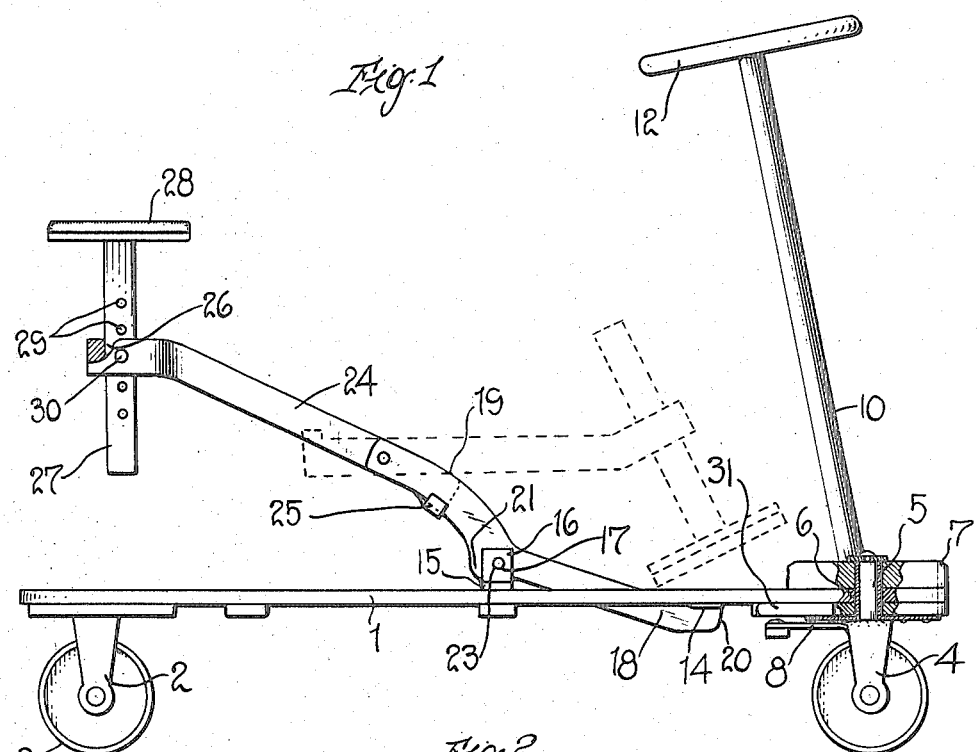
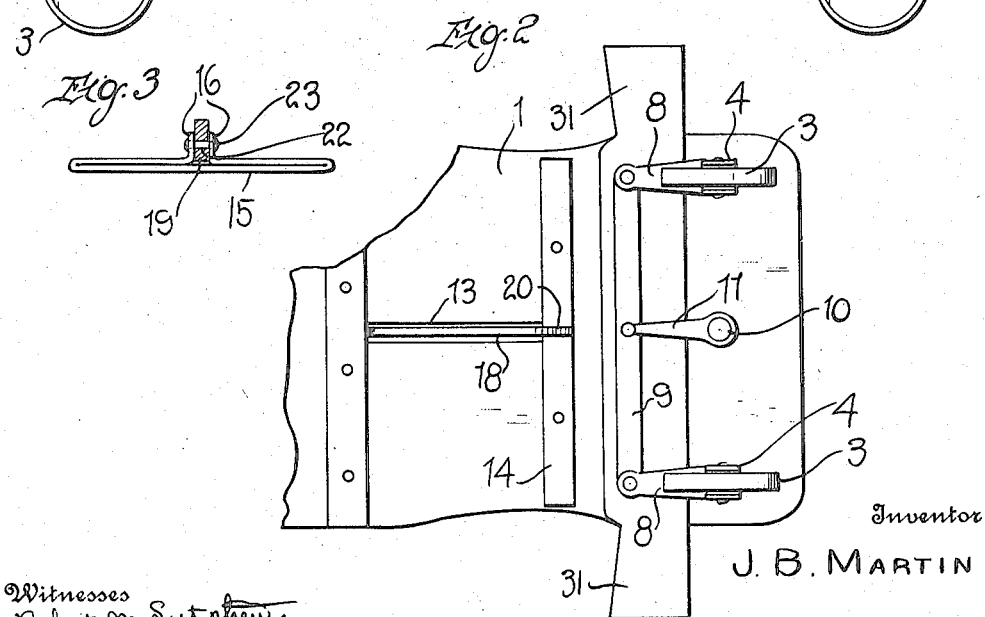
Witnesses
Robert M. Sutphen
A. J. Hind
Inventor
J. B. Martin
By Watson E. Coleman
Attorney

UNITED STATES PATENT OFFICE.

JOSEPH B. MARTIN, OF EVANSTON, WYOMING.

COASTER.

1,128,810. Specification of Letters Patent. Patented Feb. 16, 1915.

Application filed May 16, 1914. Serial No. 839,096.

*To all whom it may concern:*

Be it known that I, JOSEPH B. MARTIN, a citizen of the United States, residing at Evanston, in the county of Uinta and State of Wyoming, have invented certain new and useful Improvements in Coasters, of which the following is a specification, reference being had to the accompanying drawings.

This invention relates to new and useful improvements in coasters, and particularly to that class of coasters which are wheeled and steerable.

An object of this invention is the provision of a coaster which comprises a platform supported at its ends upon wheels, the front wheels being mounted in rotatable yokes, the yokes being connected by a steering bar to which is connected, at its lower end, an upstanding steering post, the coaster also including a seat elevated from the platform at its rear end, whereby a person seated upon the seat may readily steer the coaster in any desired direction by rotating the steering rod.

Another object of this invention is the provision of a coaster which includes a seat which is adjustably supported on a rearwardly inclined seat bar, the seat being disposed above the platform of the coaster at its rear end and the seat bar engaging the platform forwardly of its center so that the weight of the person on the seat is forwardly of the center of the platform to prevent the platform from tipping over backwardly.

A still further object of this invention is the provision of a coaster which includes a seat which is elevated above the platform at its rear end to a suitable height so that the person may reach the ground with either foot to propel the coaster, the steering post being disposed in a vertical position so that the steering wheel on the upper end thereof may be easily engaged by the hands of the person upon the seat, the steering post being used as a push rod when the person upon the seat is propelling the coaster with either foot.

With these and other objects in view, my invention consists in the novel construction, combination, and arrangement of parts to be hereinafter more fully described, claimed, and illustrated in the accompanying drawing, in which, Figure 1 is a side elevational view, partly in section of my improved coaster; Fig. 2 is a fragmentary bottom plan view thereof; and Fig. 3 is a detail view showing the manner of connecting the seat bar to the platform.

Referring more particularly to the drawing, the numeral 1 designates the platform of my improved coaster, and mounted in yokes 2 at the rear end of the platform, are the supporting wheels 3, the yokes 4 at the forward end of the plaform being provided with upwardly extending stub shafts 5 which project through openings 6 in the platform and are connected to the blocks 7 on the upper face of the platform. Extending rearwardly from each of the yokes 4 is an arm 8, and connected at its opposite ends to the arms is a stearing bar 9. Rotatably mounted at its lower end in an opening in the platform, adjacent its forward end, is a steering post 10, the lower extremity of the post projecting below the lower face of the platform and being connected to the steering bar by a suitable angle arm 11, whereby upon rotation of the post, the steering bar is moved from side to side to simultaneously turn the steering wheels. A wheel 12 is keyed to the upper end of the steering post 10, whereby the post may be readily turned to steer the coaster in any desired direction.

Formed in the platform forwardly of its center, is a longitudinal slot 13, and secured to the under face of the platform forwardly of the slot, is a wearing plate 14, and a wearing plate 15 is connected to the upper face of the platform rearwardly of the slot 13, the opposite ends of the plate 15 being directed inwardly, and the extremities of the plate being bent upwardly in spaced relation to each other to provide supporting lugs 16 in which horizontally alined openings 17 are formed. Disposed through the slot 13 is the front section 18 of a seat bar 19, the front section being provided at its forward extremity beneath the platform with a toe 20 for engagement against the wearing plate 14 on the under face of the platform, and the bar being provided adjacent its rear end with a heel 21 for engagement against the wearing plate 15 on the upper face of the platform, the section 18 being also formed with an opening 22 therein, adjacent the heel portion, the opening being adapted to register with the openings 17 in the lugs 16 for the reception of a bolt 23, by means of which the front section of the seat bar is pivotally connected to the platform. Pivotally connected to the rear extremity of the front section 18 is the rear section 24 of the seat bar 19, the rear section 24 carrying a U-shaped plate 25 for engagement against the lower edge of the front section 18, to hold the rear section of the bar in an inclined position so that the rear extremity of the rear section is disposed above the platform. A vertically disposed slot 26 is formed in the enlarged rear end of the section 24 of the seat bar, the slot being adapted to receive the standard 27 of a seat 28, the standard having a series of openings 29 therein with one of which the bolt 30 which projects through the slot 26 in the seat bar, is adapted to engage, to hold the seat in any desired vertically adjusted position with relation to the platform. Projecting from the opposite side edges of the platform at its forward end, are foot rests 31 with which the feet of the person upon the seat are adapted to engage when coasting.

In the practical use of my improved coaster, when it is desired to coast down an incline, the person using the coaster rests upon the seat 28 with his feet placed upon the foot rests 31 and his hands engaged upon the wheel 12 of the steering post, so that the coaster will move down the incline without effort on the part of the user. When the coaster reaches the bottom of the incline, it is only necessary for the person upon the seat to drop one foot over the side of the platform to the ground, and propel the coaster by striding with the foot and using the steering post as a push rod. It will, of course, be seen that, if desired, both feet may be placed upon the ground on opposite sides of the platform, the coaster being propelled by the user so that both feet are used to propel the coaster as though the person were walking.

Having thus fully described my invention, what I desire to claim and secure by Letters Patent, is:—

1. A device of the class described comprising a wheeled platform having a central longitudinal slot formed therein, a rearwardly inclined seat bar pivotally connected to the platform and projecting at its forward end through said slot, the forward extremity of the seat bar being adapted to engage the under face of the platform forwardly of the slot, and a seat carried by the rear end of the seat bar.

2. A device of the class described comprising a wheeled platform, having a central longitudinal slot formed therein, a rearwardly inclined jointed seat bar, the forward section of said seat bar being pivotally connected adjacent its rear end to the platform rearwardly of the slot, said forward section projecting through the slot and having its forward end engaged against the under face of the platform forwardly of the slot, means for holding the rear section of the seat bar in longitudinal alinement with the forward section thereof, and a seat carried upon the rear end of the rear section of the seat bar.

3. A device of the class described comprising a platform, supporting wheels connected to said platform at its rear end, steering wheels connected to said platform at its forward end, an upstanding steering post operatively connected with said steering wheels, said platform having a central longitudinal slot formed therein adjacent its forward end, a rearwardly inclined seat bar projecting at its forward end through said slot, said seat bar having a toe portion for engagement beneath the platform forwardly of the slot, a heel portion for engagement against the upper face of the platform rearwardly of the slot, and a seat carried by the upper end of said seat bar.

4. A device of the class described comprising a platform, supporting wheels connected to said platform at its rear end, steering wheels connected to the platform at its forward end, an upstanding steering post operatively connected with said steering wheels, said platform having a central longitudinal slot formed therein at its forward end, a rearwardly inclined jointed seat bar, the lower section of said seat bar being projected through the slot, said lower section being pivotally connected to said platform rearwardly of the slot and having a toe portion for engagement against the under face of the platform forwardly of the slot, means for maintaining the rear section of said jointed seat bar in longitudinal alinement with the forward section thereof, and a seat carried upon the upper end of the rear section of the seat bar.

5. A device of the character described comprising a wheeled platform, said platform having a central longitudinal slot formed therein at its forward end, a transversely extending plate connected to the upper face of the platform adjacent the rear end of the slot, the opposite ends of said plate being directed inwardly, the extremities of said plate being bent upwardly to form supporting lugs, a rearwardly inclined jointed seat bar, the forward section of said seat bar being pivotally connected adjacent its rear end between said lugs, said forward section projecting downwardly through said slot and having its forward extremity engaged against the under face of the platform forwardly of the slot, means for holding the rear section of said seat bar in longitudinal alinement with the forward section thereof, and a seat carried by the inner end of the rear section of the seat bar.

In testimony whereof I hereunto affix my signature in the presence of two witnesses.

JOSEPH B. MARTIN.

Witnesses:
M. I. McCuaig,
Arthur W. Sims.